Aug. 5, 1952  F. H. KUNKEL  2,605,553
LEVEL FOR TRAILERS
Filed Sept. 28, 1948

Inventor
Frank H. Kunkel

By *Clarence A. O'Brien*
*and Harvey B. Jacobson*
Attorneys

Patented Aug. 5, 1952

2,605,553

UNITED STATES PATENT OFFICE 2,605,553

LEVEL FOR TRAILERS

Frank H. Kunkel, Des Plaines, Ill.

Application September 28, 1948, Serial No. 51,593

3 Claims. (Cl. 33—215)

This invention relates to level indicating means and is adapted especially to be used with larger trailers, both of the dwelling type and commercial vehicle type, to indicate whether the trailer is level with the ground when it has been removed from connection with the vehicle and is jacked up into rest position.

A primary object of the invention is to provide a level that is adapted to indicate at once and with extreme accuracy any deviation from a vertical position.

Another object of the invention is to provide a level that is freely rotatable to give a true reading at all times.

Another object of the invention is to provide an indicating disk, which, by the choice of colors in proper position, will indicate at a glance whether the object being raised is level or not.

Yet another object of the invention is to provide a level which will be capable of being employed at any of four positions and still be adapted to operate accurately.

And a further object of the invention is to provide a device that is simple and durable in construction, economical in manufacture, pleasing in appearance and extremely efficient for the intended use.

Other objects and advantages will appear in the following specification, reference being had to the accompanying drawings in which.

Figure 1:
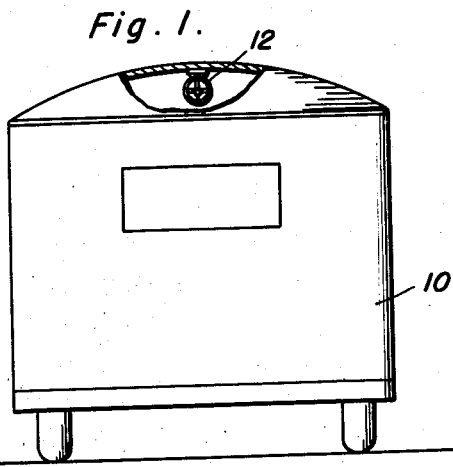
Figure 1 is a side elevation of a trailer with the invention secured thereto.

Referring to Figure 1, a trailer 10 is shown with a part broken away to disclose the indicator or level of the invention 12 secured to the top thereof. In this manner, any variation from a vertical position will be instantly registered on the device, after which adjustment may readily be made.

Figure 2:
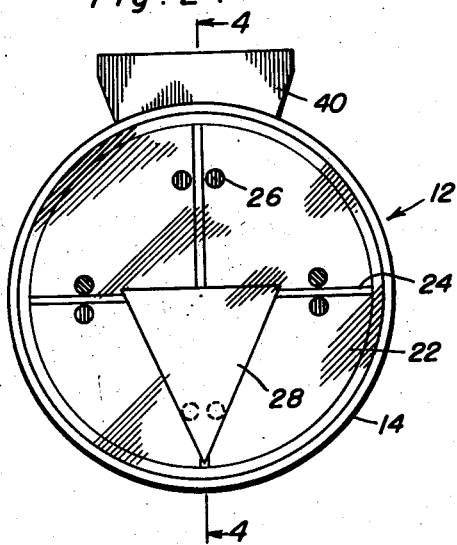
Figure 2 is a side elevation of the invention.
Figure 4:
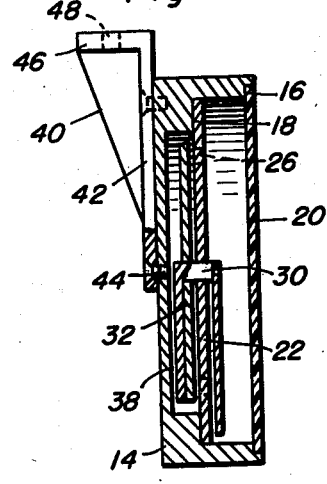
Figure 4 is a vertical transverse sectional view and is taken substantially on line 4—4 of Figure 2.
Figure 3:
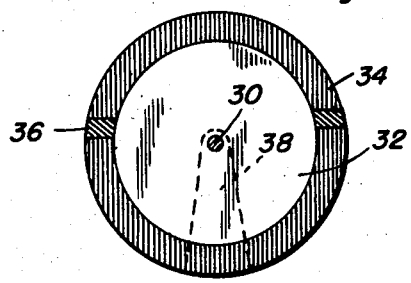
Figure 3 is a view of the color disk.

Figures 2 through 4 disclose in detail the construction of the level and consists of a base 14 and counterbored on the interior diameter thereof to provide shoulders 16 and 18. A glass face 20 is seated in shoulder 16 in friction fit relation and encloses the entire structure to prevent dust or other foreign matter from entering therein. Of course, any other transparent material may be substituted for the glass.

Press fit upon shoulder or lug 18 is indicator plate 22. Plate 22 includes a pair of transverse rulings 24, rulings 24 being at right angles to each other. On each side of rulings 24 are provided apertures or holes 26, approximately intermediate the length of the radius thereof, for a purpose presently to appear. A triangular pointer 28 is secured between plate or disk 22 and the glass portion 20 by means of pivot pin 30 extending through the mid-point of disk 22. It will be noted that pointer 28 is secured at the uppermost portion at exactly its mid-point.

As is best seen in Figure 3, a color plate 32 is mounted onto the pin 30 between the bottom of base 14 and disk 22. Plate 32 may be of solid construction, preferably, and will be of a solid color such as red around the perimeter thereof at 34, band 34 overlying apertures 26. A pair of oppositely disposed color bands 36 of a color different from color 34, and generally green, is painted in the manner shown in the figure to extend slightly above the mid-point of plate 32.

A suitable weight 38 is then secured to the device.

Angle bracket 40 provides the attaching means to a trailer or the like and includes a vertical leg 42 secured by screws or the like 44 to base 14 and a lateral leg 46 suitably apertured at 48 for attachment purposes.

Thus, in use the device will be secured by bracket 40 to the point of attachment for a vehicle and the device will normally be retained in the position seen in Figure 2. This will cause pointer 28 to be positioned vertically and directly on one of rulings 24. When this position is obtained, green color band 36 is aligned in the slots adjacent and just above pointer 28 to indicate a perfectly level condition. Should the angle of inclination be very slight, both the pointer and color plate would rotate to indicate at a glance the change. It is now a simple matter to adjust for the tilt until the trailer body is again perfectly level.

The device is adapted to be mounted in any position of right angles, since both pointer 28 and color plate 32 freely rotate to become aligned at the proper cooperating apertures 26.

The base and indicator disk are preferably made of aluminum for both lightness and non-corrosiveness, but it is understood that any desired material, such as plastics, wood or the like may be substituted therefor.

It is understood by those skilled in the art that variations in the above described modification involving the substitution of equivalents are intended to be comprehended within the spirit of the present invention and it is not confined to the exact showing of the drawings nor to the precise construction described and, therefore, such changes and modifications may be made therein as do not affect the spirit of the invention nor exceed the scope of the appended claims.

Having described the invention, what is claimed as new is:

1. A level comprising a casing having an open face, means for attaching the casing to a support, a transparent plate covering the face of the casing, a fixed indicator disk disposed in said casing parallel with the transparent plate, a pivot element disposed transversely through the center of the disk, a pointer fixed on one end of the pivot element and disposed between the transparent plate and disk, a movable indicator disk and pendulum fixed on the other end of the pivot element, said fixed disk being formed on its outer face with rulings complementary to said pointer, said movable disk having indicating areas formed thereon and said fixed disk being formed with transverse spaced openings to selectively expose said areas.

2. The combination of claim 1 wherein one of said openings in said fixed disk and said pointer are so constructed and arranged that said pointer registers with and overlies that opening only when the support is in its level position.

3. A level comprising a casing having an open face, means for attaching said casing to a support, a vertically disposed fixed indicator disk disposed in said casing, a pivot element extending centrally through said fixed disk, a pointer on one end of said element and a pendulum on the other end of said element, a movable indicator disk mounted on said element between said pendulum and said fixed indicator disk, said fixed disk having a first and a second pair of openings therein diametrically opposed from each other, the openings in each pair being circumferentially spaced from each other, said movable disk having indicating areas thereon so arranged that each register with one of the openings of the respective pairs of openings when the support to which said level is attached is in a level position.

FRANK H. KUNKEL.

REFERENCES CITED

The following references are of record in the file of this patent:

UNITED STATES PATENTS

| Number | Name | Date |
|---|---|---|
| 531,239 | White | Dec. 18, 1894 |
| 1,366,430 | Sperry | Jan. 25, 1921 |
| 1,424,229 | Wyckoff | Aug. 1, 1922 |
| 1,430,535 | Cocayne | Oct. 3, 1922 |
| 1,618,237 | Sturm | Feb. 22, 1927 |
| 1,664,695 | Masters | Apr. 3, 1928 |
| 2,088,326 | Klopfer | July 27, 1937 |
| 2,269,503 | Zimmerman | Jan. 13, 1942 |

FOREIGN PATENTS

| Number | Country | Date |
|---|---|---|
| 111,159 | Australia | 1940 |
| 791,315 | France | 1935 |